United States Patent [19]
Redey et al.

[11] Patent Number: 5,536,593
[45] Date of Patent: Jul. 16, 1996

[54] ELECTROCHEMICAL CELL

[76] Inventors: Laszlo I. Redey, 6851 Carpenter St., Downers Grove, Ill. 60516; Donald R. Vissers, 611 Clover Ct., Naperville, Ill. 60540; Jai Prakash, 2205 Arbor Cir. 8, Downers Grove, Ill. 60515

[21] Appl. No.: 211,554

[22] PCT Filed: Oct. 8, 1992

[86] PCT No.: PCT/US92/08599

§ 371 Date: Dec. 5, 1994

§ 102(e) Date: Dec. 5, 1994

[87] PCT Pub. No.: WO93/07650

PCT Pub. Date: Apr. 15, 1993

Related U.S. Application Data

[63] Continuation-in-part of Ser. No. 830,719, Feb. 4, 1992, Pat. No. 5,340,668, which is a continuation-in-part of Ser. No. 774,204, Oct. 10, 1991, abandoned.

[51] Int. Cl.$^6$ .............................. H01M 4/36; H01M 10/39
[52] U.S. Cl. .............................. 429/103; 429/50; 429/104; 429/112; 429/218
[58] Field of Search .............................. 429/50, 102–104, 429/112, 221–223, 218

[56] References Cited

U.S. PATENT DOCUMENTS

| | | |
|---|---|---|
| 4,288,506 | 9/1981 | Coetzer et al. . |
| 4,546,055 | 10/1985 | Coetzer et al. .......................... 429/103 |
| 4,592,969 | 8/1986 | Coetzer et al. ..................... 429/103 X |
| 4,910,105 | 3/1990 | Tilley et al. ............................ 429/103 |
| 4,973,534 | 11/1990 | Adendorff et al. ................. 429/104 X |

*Primary Examiner*—Anthony Skapars
*Attorney, Agent, or Firm*—Emrich & Dithmar

[57] ABSTRACT

An electrochemical cell having a bimodal positive electrode, a negative electrode of an alkali metal, and a compatible electrolyte including an alkali metal salt molten at the cell operating temperature. The positive electrode has an electrochemically active layer of at least one transition metal chloride at least partially present as a charging product, and additives of bromide and/or iodide and sulfur in the positive electrode or the electrolyte. Electrode volumetric capacity is in excess of 400 Ah/cm$^3$; the cell can be 90% recharged in three hours and can operate at temperatures below 160° C. There is also disclosed a method of reducing the operating temperature and improving the overall volumetric capacity of an electrochemical cell and for producing a positive electrode having a BET area greater than $6\times10^4$ cm$^2$/g of Ni.

15 Claims, 6 Drawing Sheets

ELECTROCHEMICAL CELL

CONTRACTUAL ORIGIN OF THE INVENTION

The United States Government has rights in this invention pursuant to Contract No. W-31-109-ENG-38 between the U.S. Department of Energy and The University of Chicago representing Argonne National Laboratory.

BACKGROUND OF THE INVENTION

This application is a continuation-in-part application of U.S. patent application Ser. No. 830,719, filed Feb. 4, 1992, now U.S. Pat. No. 5,340,668, which was a continuation-in-part application of application Ser. No. 774,204, filed Oct. 10, 1991, now abandoned.

This invention relates to an electrochemical cell and to methods of fabricating the cell and improving its capacity and/or power and capability of operating at low temperatures. The invention also relates to a new positive electrode or cathode during discharge for electrochemical cells and method of fabricating same, and more particularly, relates to electrochemical cells and positive electrodes for metal chloride batteries having lower internal impedance and greater discharge capacity with a higher specific energy and power.

According to the invention, an electrochemical cell comprises an alkali metal, and preferably, a sodium negative electrode or anode during discharge which is molten at operating temperatures of the cell, an alkali and preferably, a $Na^+$ ion conducting solid electrolyte/separator, a molten salt liquid electrolyte in the positive electrode compartment which is compatible with the positive electrode, and which is also at least partially molten at the operating temperature of the cell, and a positive electrode which is impregnated by the liquid electrolyte and which comprises, as the electrochemically active positive electrode substance of the cell, a transition metal chloride which preferably is selected from the group consisting or iron chloride, nickel chloride, chromium chloride, cobalt chloride and manganese chloride or mixtures thereof. Since the cell with a Na electrode has received the major development effort, a shorthand method of referring to these cells is (Na/MCl$_2$) battery or electrochemical cell, wherein M is one of the transition metals identified above. Batteries of this type are disclosed in U.S. Pat. No. 4,288,506 issued Sep. 8, 1981, to Coetzer et al. and U.S. Pat. No. 4,546,055 issued Oct. 8, 1985 to Coetzer et al. and U.S. Pat. No. 4,592,969 issued Jun. 3, 1986 to Coetzer et al. The batteries or electrochemical devices of the type herein discussed are useful as a power source alternative to petroleum engines and are being developed commercially, not only for electrically powered vehicles, but also for load leveling in electrical utilities.

An ideal electrochemical cell or battery should exhibit a number of characteristics, including low resistance and high discharge rates, operation over a wide temperature range, a capability to operate over a large number of cycles, and high energy on a volume, weight and cell basis. Generally, these types of electrochemical cells or batteries consist of two dissimilar metals in an ionically conductive medium, with the ionization potential of one metal sufficiently higher than the other metal to yield a voltage upon reduction/oxidation redox (coupling) over and above that needed to break down the electrolyte continuously at the positive electrode.

Metal typically goes into solution at the negative electrode or anode, releasing electrons to travel in the external circuit to the positive electrode, or cathode, doing work in transit. Material which will go through a valency drop on electrochemical discharge is included in the positive electrode. In essence, this material, the oxidizer, accepts electrons coming from the negative electrode and serves as the depolarizer. The depolarizer or cathode is positioned, in one embodiment, in the positive electrode in combination with some electrolyte-containing matrix, and should be porous to allow access of the electrolyte to the enlarged area of the depolarizer or cathode. Porosity of the cathode provides a surface at which the redox reaction may take place.

The economic and social advantages of powering automobiles from batteries are considerable as the vehicles could operate at relatively high efficiencies, such as 30–40%, and be non-polluting. Two important characteristics are considered in seeking an energy storage system for a vehicle. One of the characteristics or variables, specific power, designed in watt per kilogram (W/kg), determines to a large extent, acceleration and speed capabilities. The other consideration or variable of specific energy is designated as watt hours per kilogram (Wh/kg), determines vehicle range. The capacity density of a cell, or how much electrochemical energy the electrode will contain per until volume is designated as ampere hours per cubic centimeter (Ah/cm$^3$).

It is generally seen, therefore, that increasing the cell capacity available during discharge and the cell power by lowering the internal impedance of the cell are both important attributes in the consideration of how and when and to what extent electrochemical cells will be placed in the vehicle as a significant portion of the vehicle propulsion systems.

Sodium/Metal chloride cells of the type disclosed in the patents hereinbefore identified use a sodium anode, a β" alumina solid electrolyte and a cathode designated as Mcl$_2$ with a molten electrolyte of sodium chloroaluminate, $NaAlCl_4$.

Metal halide batteries exploit the higher electrolysis threshold values of the electrolyte constituents. In charging, the positive electrode becomes poor in sodium salt with sodium metal being deposited on the negative electrode and the halogen electrochemically reacting with the metal to form a metal halide. Among halides, the fluorides and chlorides exhibit higher electrolysis thresholds than bromide and iodides, and therefore are preferred and generally used. As such, metal chloride and metal fluoride systems exhibit relatively higher energy densities and lighter mass than systems using bromides and iodides. Because of the better electrochemical properties and low price, the metal chloride systems are preferred.

As with other electrochemical cells, metal halide batteries generate electricity by transporting electrons from the fuel constituent to the oxidizer, with concomitant oxidation and reduction occurring at the negative electrode or anode and the positive electrode or cathode, respectively. The following reaction occurs:

$$MX_2 + 2\ Na \rightleftharpoons 2\ NaX + M$$

where M is a transition metal and preferably is one or more of nickel, iron, cobalt, chromium and manganese and X is a halogen, preferably chlorine. The left hand side of the above equation depicts a charged state, before reduction of the metal halide, with the right hand side of the equation depicting a discharged state with reduced transition metal.

Utilization of the metal/chloride system is usually expressed on the basis of the ratio of the reacted NaCl to the total quantity of NaCl used to fabricate the positive electrode. This practice is convenient for the Na/MCl$_2$ cell because they are fabricated in the discharge state and the $MCl_2$ active material is formed electrochemically, as noted in the above cell reaction. As used hereinafter, weight percent of a constituent in the positive electrode refers to the positive electrode in the dry state, as the electrodes exist prior to being placed in the electrochemical cell and cycled to charge the cell.

One of the significant problems in the sodium metal halide batteries is the limited battery capacity, due to the chloride of the positive electrode metal which forms a layer of low conductivity on the positive electrode. Since this metal chloride has limited conductivity, after it reaches a certain thickness on the order of one micrometer, it practically terminates further charge uptake of the cell. It has also been noted that cell capacity may be lowered after repeated charge and discharge cycles. Previous efforts to improve cell performance have involved the addition of sulfur to the liquid electrolyte or the addition of sulfide to the porous positive electrode. Neither of these solutions has been totally satisfactory.

SUMMARY OF THE INVENTION

It is an object of the present invention to provide a positive electrode and electrochemical cell including same which overcomes the limited capacity of prior cells and permits enhanced charge uptake.

Another object of the invention is to provide an electrochemical cell of the alkali/metal transition metal halide type which has increased specific energy and power output due to lower internal impedance.

One feature of the present invention is the use of bromide and/or iodide containing additives in the positive electrode compartment to increase cell capacity and power.

Another object of the invention is to use certain pore formers in the cathode in combination with the bromide and/or iodide additions as described herein providing improved electrode morphology and lower impedance resulting in lower cell operating temperatures.

Yet another object of the invention is to provide improved cell capacity and specific energy and power particularly with lower internal impedance due to the use of a bromide and/or iodide additives, pore formers in the cathode and sulfur present either in the electrolyte or in the cathode or both.

In brief, the objects and advantages of the present invention are achieved by providing electrochemical cells with various combinations of additives including bromide and/or iodide and sulfur containing materials and pore formers for electrode fabrication.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DETAILED DESCRIPTION OF THE INVENTION

While the invention is primarily described with respect to a sodium-transition metal chloride cell, it is to be understood that the invention includes cells from other alkali metals, such as lithium and potassium, with the electrolyte being changed to correspond to the particular alkali metal.

Figure 1:
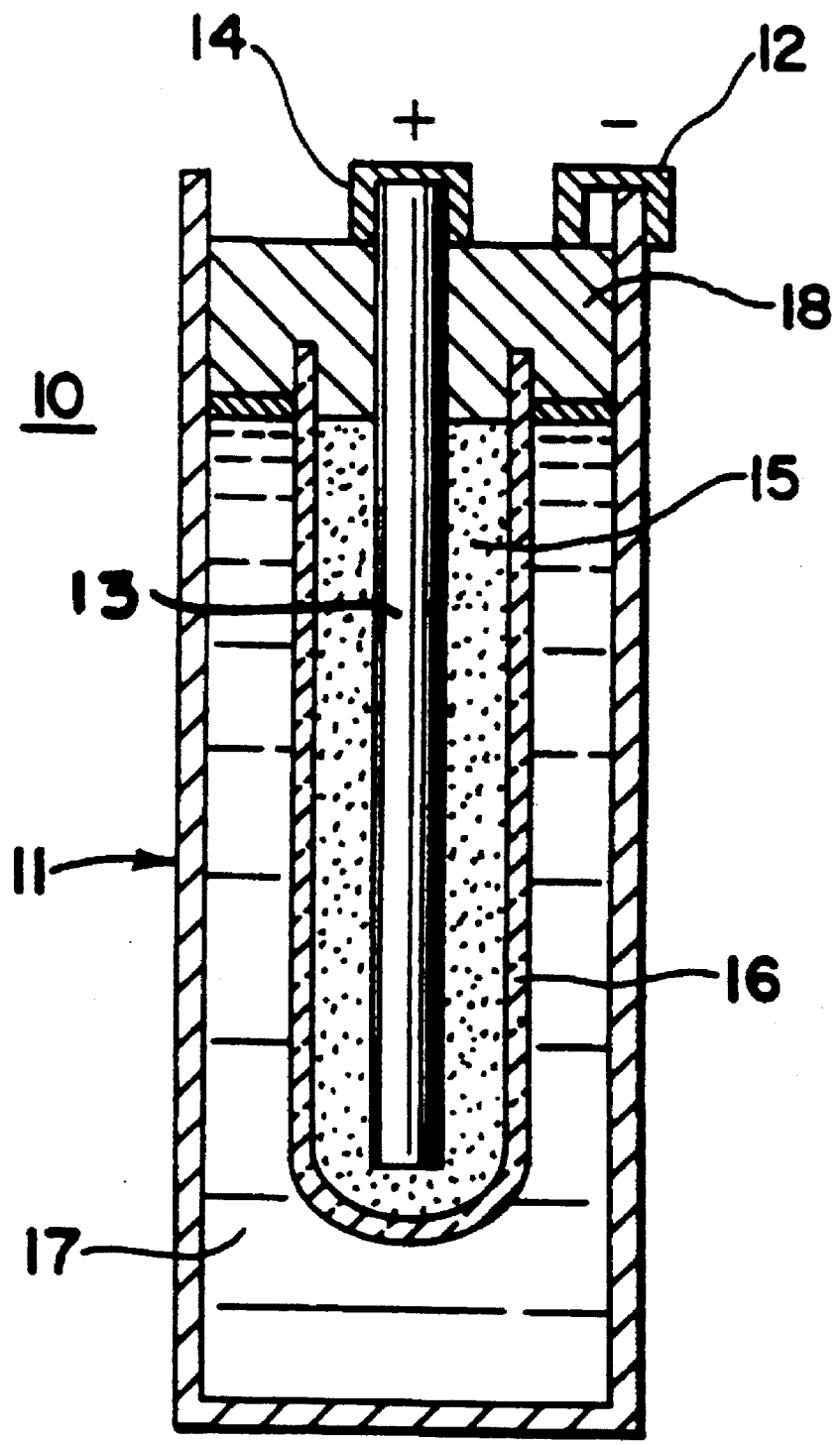
FIG. 1 is a schematic view of one embodiment of the invention in the form of an electrochemical cell.

Referring now to FIG. 1 of the drawings, there is disclosed a sodium/metal chloride cell in schematic illustration. A single cell 10 is illustrated, it being understood that a plurality of such cells may be connected in series, as well as in parallel, to provide the required voltage and battery capacity for any specific use such as powering an electric car, or the like. The electrochemical cell 10 includes an outer casing 11 of any suitable container which can act as a negative electrode, the container may be steel or any other suitable electron conducting material. Alternate metals may be nickel or stainless steel, it being understood that any good electrical conductor which does not react with the negative electrode material, which in this case is sodium, may be used as an outer casing. The outer casing has a negative buss or terminal 12 electrically connected to the casing positioned at the top of the cell 10. A positive electrode or cathode 13 includes a solid rod of a transition metal and preferably nickel or iron or chromium or cobalt or manganese or any combination of alloys thereof which acts as a current collector and leads to a positive buss 14 at the top for connection as desired. The solid rod 13 is surrounded by positive electrode material 15 which is a combination of the chloride of the solid rod 13 and in the partially discharged state sodium chloride and an electrolytic material, such as sodium chloroaluminate, $NaAlCl_4$. With lithium or potassium as the negative electrode, the electrolyte would be $LiAlCl_4$ or $KAlCl_4$, respectively.

For illustrative purposes, the positive electrode may contain nickel, nickel chloride, sodium chloride and sodium chloroaluminate which is also liquid at cell operating temperatures which are generally in the range of from about 200° C. to about 400° C., but normally prior art cells operate in the range of from about 250° C. to about 335° C. A β" alumina electrolyte solid tube 16 is positioned to contain the rod 13 and the positive electrode material 15 consisting of the chloride of the rod 13 along with the sodium chloroaluminate. Outwardly of the β" alumina electrolyte 16 is the negative electrode 17 of sodium metal, which is liquid at cell operating temperatures. Finally, the cell 10 is closed by an alumina header 18 in the form of a disc. The cell reactions for a positive electrode of NiCl$_2$ or FeCl$_2$ as hereinbefore stated are:

NiCl$_2$+2 Na⇌2 NaCl+Ni      2.59 V

FeCl$_2$+2 Na⇌2 NaCl+Fe      2.35 V

As hereinbefore stated, the positive electrode may be of a variety of materials or transition metals, specifically the materials may include iron, nickel, cobalt, chromium, manganese, or alloys thereof. While one transition metal is normally used for the positive electrode, combinations may have some advantages. As an illustration, iron powder may be used with a nickel rod as a current collector with FeCl$_2$ as the metal chloride in the molten electrolyte. For purposes of example only, and without limiting the scope of the invention, the nickel/nickel chloride positive electrode will be described. In all cases, the negative electrode or anode was sodium metal, liquid at cell operating temperatures. In addition, sodium chloroaluminate was used with the β" alumina as the electrolyte material 16. To provide enough capacity and form sufficient quantity of nickel chloride, sodium chloride must be added to the positive electrode during fabrication. Up to 0.66 gNaCl/gNi ratio and high surface area of the nickel particles are required to achieve high capacity density (mAh/cm$^3$). With the 0.66 gNaCl/gNi ratio, up to 33–50% electrochemical utilization of nickel is possible. For cells with lithium or potassium electrodes, the salt would be LiCl or KCl.

Also, as hereinbefore stated, the nickel/nickel chloride positive electrode has a capacity and specific power which is limited by the nickel chloride layer formation on the surface of the nickel particles, which nickel chloride layer forms when the cell is charged. After the nickel chloride reaches a thickness on the order of about one micrometer, further charge uptake is terminated. In order to remedy this inherent limitation and improve the capacity and power characteristics of the nickel/nickel chloride cell, the following additives and preparation techniques were examined.

In general, the additives found beneficial contained bromide, iodide, sulfur, and various pore formers. More specifically, it was found that bromide could be present in the range of 1 to 25 wt % expressed on the basis of the weight of the positive electrode and as equivalent to NaBr on the basis of halogenoid content, and/or iodide could be present in the range of 0.05 to 25 wt % expressed on the basis of the weight of the positive electrode and as equivalent to NaI on the basis of the halogenoid content. The preferred amounts of NaBr and NaI or their equivalents on halogenoid basis used were 5–10% and 5–12% by weight, respectively, but in any event, the total amount of halide should not exceed about 30% by weight. It is to be understood that other sources of the bromide and iodide may be used, such as AlBr$_3$, AlI$_3$, NiBr$_2$ and PbI$_2$, with the preferred amounts being in the above ranges based on the sodium salts.

Sulfur can be added to the positive electrode as elemental sulfur or sulfide, such as Na$_2$S; the useful range for sulfur is 0.05 to 10 wt % with about 2% by weight being preferred. Where various combinations of halide and sulfur are used as additives, preferably the combination should not exceed about 30% by weight.

The pore former may be any material which decomposes to gases during fabrication. The preferred pore formers are the ammonium salts of carbonic acid or other weak organic acids, such as formic, acetic or oxalic acid or these weak organic acids themselves since these do no cause undesirable reactions with the materials of the cell. Other materials such as oxamide or methylcellulose may also be used as pore formers, but the preferred pore former is (NH$_4$)$_2$CO$_3$. The pore former may be present in the range of from about 5% to about 20% by weight, the preferred range being about 5% to about 15% and the best results being about 10% by weight.

It is believed that the superior results reported herein are due, in part, to the modification of the chloride coating and to the controlled pore distribution during positive electrode fabrication, thereby increasing cell performance. This increased performance is primarily evidence in capacity and/or power which may occur by a result of decreased impedance or by increasing the amount of active electrode material during the charge cycles. While the other alkali and transition metals may be used for cells of the invention, the results are particularly favorable for the Na/NiCl$_2$ cell.

Where nickel felt or foam was used instead of nickel powder, the felt could be used alone or additional nickel powder sintered to the felt could be used. The pore former was always used with a sintered nickel electrode, and weight percents for the pore former relate to the amount of the pore former before sintering.

Figure 2:
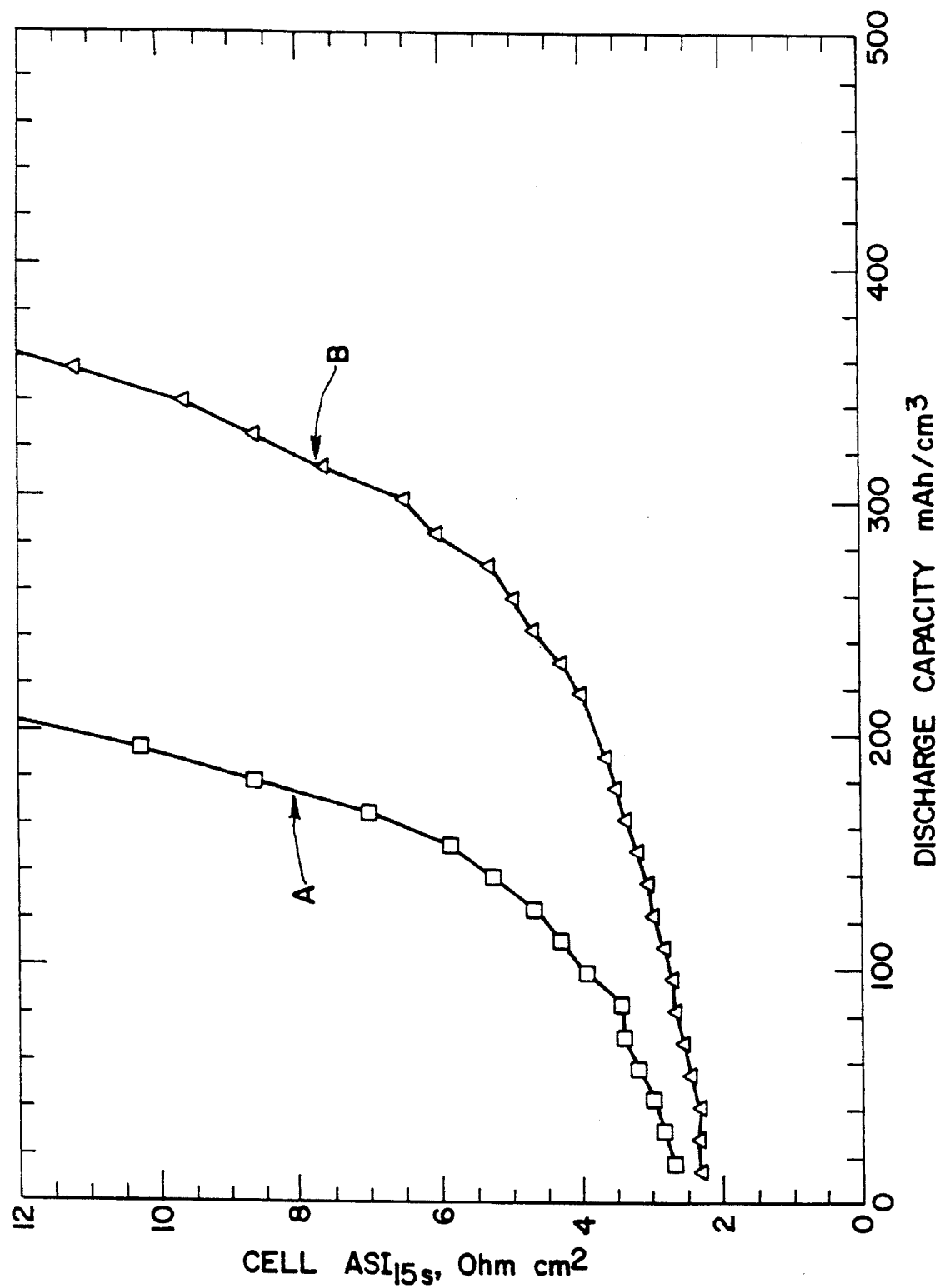
FIG. 2 is a graphical illustration of the relationship between the area-specific impedance and the discharge capacity of the cell for cells with no additives and cells with a 2 weight percent sulfur additive.

Referring now to FIG. 2, the relationship between cell impedance and discharge capacity is illustrated for a sodium/nickel chloride cell having no additives and no pore formers, it is seen that the cell impedance of curve A in FIG. 2 sharply rises at relatively low discharge capacities to provide a relatively unsatisfactory cell. Curve B of FIG. 2 shows the slightly improved results when sulfur (2 wt %) is added to the liquid electrolyte but the impedance is still very high at a relatively low discharge capacity.

Figure 3:
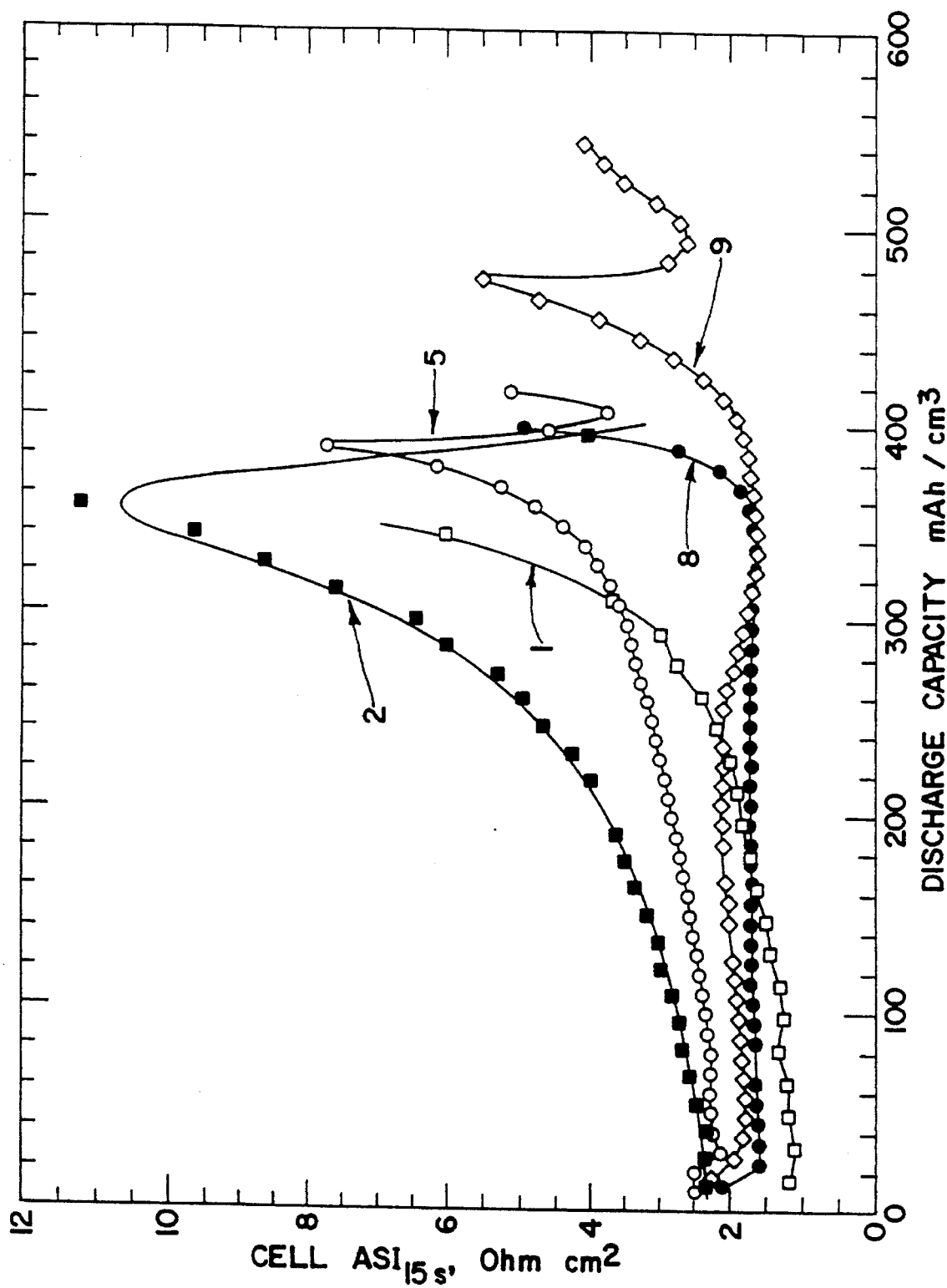
FIG. 3 is a graphical illustration of the relationship between the area-specific impedance and discharge capacity like FIG. 2 for various combinations of additives to for the basis of the invention.
Figure 4:
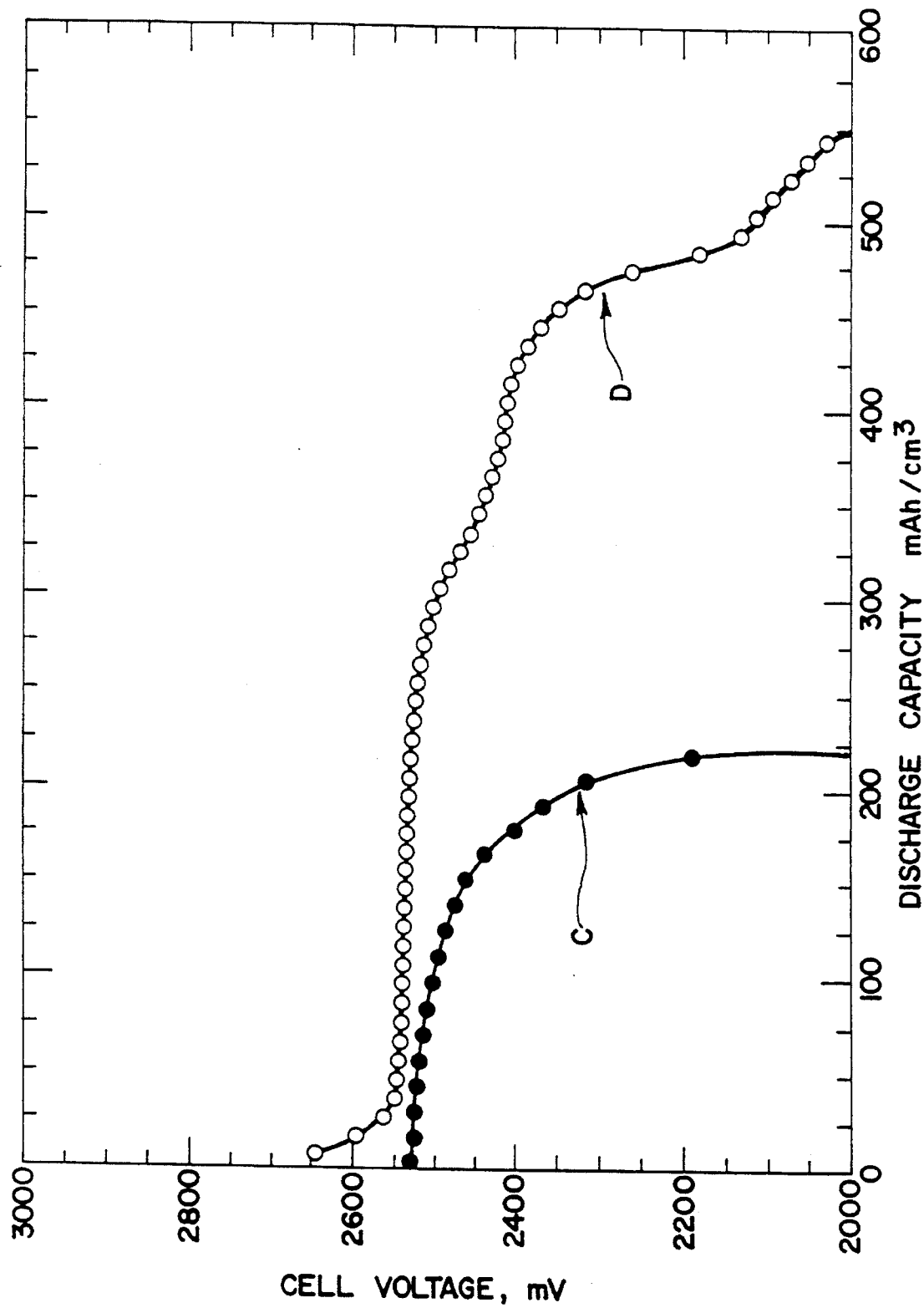
FIG. 4 is a graphical illustration of the relationship between cell voltage and discharge capacity for a cell without additives and a cell with additives.

In the examples as described below, positive electrodes were fabricated as described for each example and installed in a cell as illustrated in FIG. 1 with a sodium negative electrode, solid electrolyte, and a NaCl and NaAlCl$_4$ electrolyte which is molten at the operating temperature of 300° C. A voltage of up to 3.1 V was applied to charge the cell with the capacity, power and/or impedance measured as illustrated in FIGS. 3–4 or for the charging time illustrated in FIG. 5. Performance during discharge was also measured. Repeated cycles of charge, and discharge were carried out.

EXAMPLE 1

7 wt % NaBr+10 wt % Pore Former

This examples illustrates the typical fabrication of Ni/NiCl$_2$ electrode with the performance shown in FIG. 3, plot 1. The weight of the materials are relative to the dry electrode weight 4.3 g nickel powder (0.68 M$^2$/g BET area, 0.55 g/cm$^3$ bulk density, 1.74 g sodium chloride powder with mesh size −270+325, 0.605 g sodium chloride with mesh size −325+400, and 0.500 g sodium bromide (325+400 mesh size) were mixed together thoroughly. To this mixture of the salts a 0.7145 g of the pore former, ammonium bicarbonate was added and thoroughly mixed. The mixture was then placed in a stainless steel die and pressed to obtain an electrode with 2.85 cm diameter and 0.5 cm thickness. This electrode as described above was then placed in a tube furnace and heated first at 250° C. for 30 minutes under a hydrogen containing atmosphere (5% hydrogen+95% helium) in order to remove pore former as ammonia, water, and carbon dioxide gases and finally to 700° C. for one hour for sintering. The electrode was removed from the furnace and placed in the cell in the positive electrode compartment. The cell was charged and discharged with the discharge performance being measured and illustrated in FIG. 3, plot 1. A comparison of FIG. 3, plot 1 with FIG. 2, curve A, reveals the improvement in performance provided by the addition of the bromide additive and use of the pore former.

EXAMPLE 2

7 wt % NaBr+1 wt % Vapor—Phase Sulfidation

The positive electrode was fabricated by the same procedure as described in Example 1. The amounts of the chemical used was also exactly as in Example 1, except that no pore former was used for this electrode and, therefore, the electrode was not heated at 250° C. Rather, the electrode was heated directly at 700° C. for one hour. After removing the electrode from the furnace it was sulfidized to 1.0 weight percent by sulfur vapor. The performance of this cell system is shown in FIG. 3, plot 2. A comparison of FIG. 3, plot 2 with FIG. 2, curve A, reveals the improvement in performance provided by the addition of the bromide addition and the/wt % sulfur.

EXAMPLE 3

7 wt % NaBr+10 wt % Pore Former+0.5 wt % Vapor Phase Sulfidation

NaBr (0.5 g) and pore former (1.45 g) were introduced in the electrode as described above for Example 1 and the electrode was sintered and then sulfidized by 0.035 g of sulfur. Tests on the cell demonstrated that this combination produced better capacity, cycle life and lower impedance than the combination described in Example 2. More specifically, the curve for this Example would be between FIG. 3, plot 1 and plot 2.

EXAMPLE 4

7 wt % NaBr+2 wt % S in Electrolyte

NaBr (0.5 g) was introduced in the electrode as described and 2 wt % sulfur by the electrode weight (7.145 G) was incorporated to the liquid $NaAlCl_4$ electrolyte. This combination produced lower cell impedance and higher capacity than the cell in Example 3. These results demonstrated that the addition of sulfur to the electrolyte also resulted in an improvement in cell performance.

EXAMPLE 5

7 wt % NaBr+10 wt % Pore Former+2 wt % S in the Electrolyte

The positive electrode was fabricated in accordance with the procedure described in Example 1. A 2 wt % sulfur by the electrode weight (7.145 g) was mixed very thoroughly to the liquid $NaAlCl_4$ electrolyte by slowly and carefully increasing the temperature to 200° C. After mixing the sulfur with the $NaAlCl_4$ electrolyte, the positive electrode was placed in the positive electrode assembly of a $Na/NiCl_2$ cell. The performance of this cell system is shown in FIG. 3, plot 5. A comparison of FIG. 3, plot 5 with plot 1, reveals the improvement in performance provided by the combination of the bromide addition, the pore former and sulfur.

EXAMPLE 6

0.5 wt % NaI+10 wt % Pore Former+2 wt % Sulfur

Pore former was introduced in the electrode during electrode fabrication. NaI (0.035 g) and sulfur (0.1429 g) were added to the electrode or electrolyte. The combination produced better cell capacity and impedance than the cell in Example 5. More specifically, the curve for this example would be between the curves for FIG. 3, plot 5 and plot 8, and would reveal that the small addition of the iodide was very effective compared to the bromide addition of Example 5.

EXAMPLE 7

7 wt % NaBr+2 wt % NaI+10 wt % Pore Former

This combination was incorporated in the nickel chloride electrode during fabrication. The incorporation was achieved with or without the pore former, but the inclusion of pore former produced better results.

EXAMPLE 8

7 wt % NaBr+10 wt % Pore Former+5 wt % NaI in the Electrolyte

The positive electrode was fabricated in accordance with the procedure described in Example 1 except lower sintering temperature of 550°–650° C. was used. The amounts of the chemical used was exactly the same as in Example 1. Before placing the electrode in the positive electrode assembly, sodium iodide (0.3573 g) was added to the electrolyte. After this step, the positive electrode was placed in the cell assembly. The performance of this cell system is shown in FIG. 3, plot 8.

EXAMPLE 9

7 wt % NaBr+10 wt % NaI+10 wt % Pore Former+5 wt % Sulfur

The positive electrode $Ni/NiCl_2$ was fabricated in accordance with the procedure described in Example 8. Before placing the electrode in cell assembly, a 5 wt % sulfur (0.3572 g) and 10 wt % sodium iodide (0.7145 g) by the electrode weight (7.145 g) were added to the $NaAlCl_4$ electrolyte. The electrode was then placed in the positive electrode compartment of $Na/NiCl_2$ cell. The performance of this cell system is shown in FIG. 3, plot 9. A comparison of the curves for FIG. 3, plot 9 and plot 8, reveals the improvement provided by the combination of additive plus the pore former.

EXAMPLE 10

10 wt % NaI+20 wt % Pore Former 1.36 g Ni (15 vol %), 0.552 g NaCl (−270+325 mesh size), 0.259 g NaCl (−325 mesh size), and 0.231 g NaI (−325 mesh) were mixed together thoroughly. To this mixture of the salts a 0.4804 g of the pore former ammonium bicarbonate was added and thoroughly mixed. The mixture was then placed in a stainless steel die and pressed to obtain an electrode with 1.15 cm diameter and 1.0 cm long. This electrode, as described above, was then placed in a tube furnace and heated first at 250° for 30 minutes, under a hydrogen-containing atmosphere (5% hydrogen+95% helium) in order to remove pore former as ammonia, water, and carbon dioxide gases and, finally, to 600° C. for one hour for sintering. The electrode was removed from the furnace and placed in a cell having the positive electrode within the β"-alumina tube and sodium negative electrode outside the tube. A 2 wt % NaI (0.048 g) relative to the dry electrode weight was added to the liquid $NaAlCl_4$ electrolyte. The cell was charged and discharged and the performance of the cell provided data for a curve between curve 1 and curve 5 in FIG. 3.

EXAMPLE 11

1 wt % NaI+20 wt % Pore Former

The positive electrode was fabricated by the same procedure as described above in Example 10. In this example, however, 1 wt % NaI was used. The electrode was sintered in the same way as described in the example. The performance of this electrode was lower than the electrode described in Example 10, but was improved over the performance by FIG. 3, curve 1.

FIG. 3 correlates to the various examples above reported and shows the continued improvement in lowering impedance and expanding the capacity of the cell for each addition of additives. For instance, curve 1 relates to the cell made as reported in Example 1 and the other curves, 2, 5, 8, and 9 each corresponds to the same number Example. It is clear that the Example 9 which includes 10 wt % sodium bromide, 2 wt % sodium iodide, 3 wt % sulfur with the use of the ammonium bicarbonate pore former in the amount of about 10% by weight of the dry positive electrode provided the best results for the tests. In all cases, percentages of additives expressed as weight percentages of the positive electrode relates to the weight of the positive electrode in the dry state, that is before being soaked with the electrolyte and changed through cycling.

FIG. 4 shows the relationship between cell voltage and discharge capacity for curve C representing a cell without any additives and curve D representing a cell made according to Example 9. As can be seen, the capacity is much improved using the cell of the invention compared to an electrochemical cell without additives whatsoever.

Figure 5:
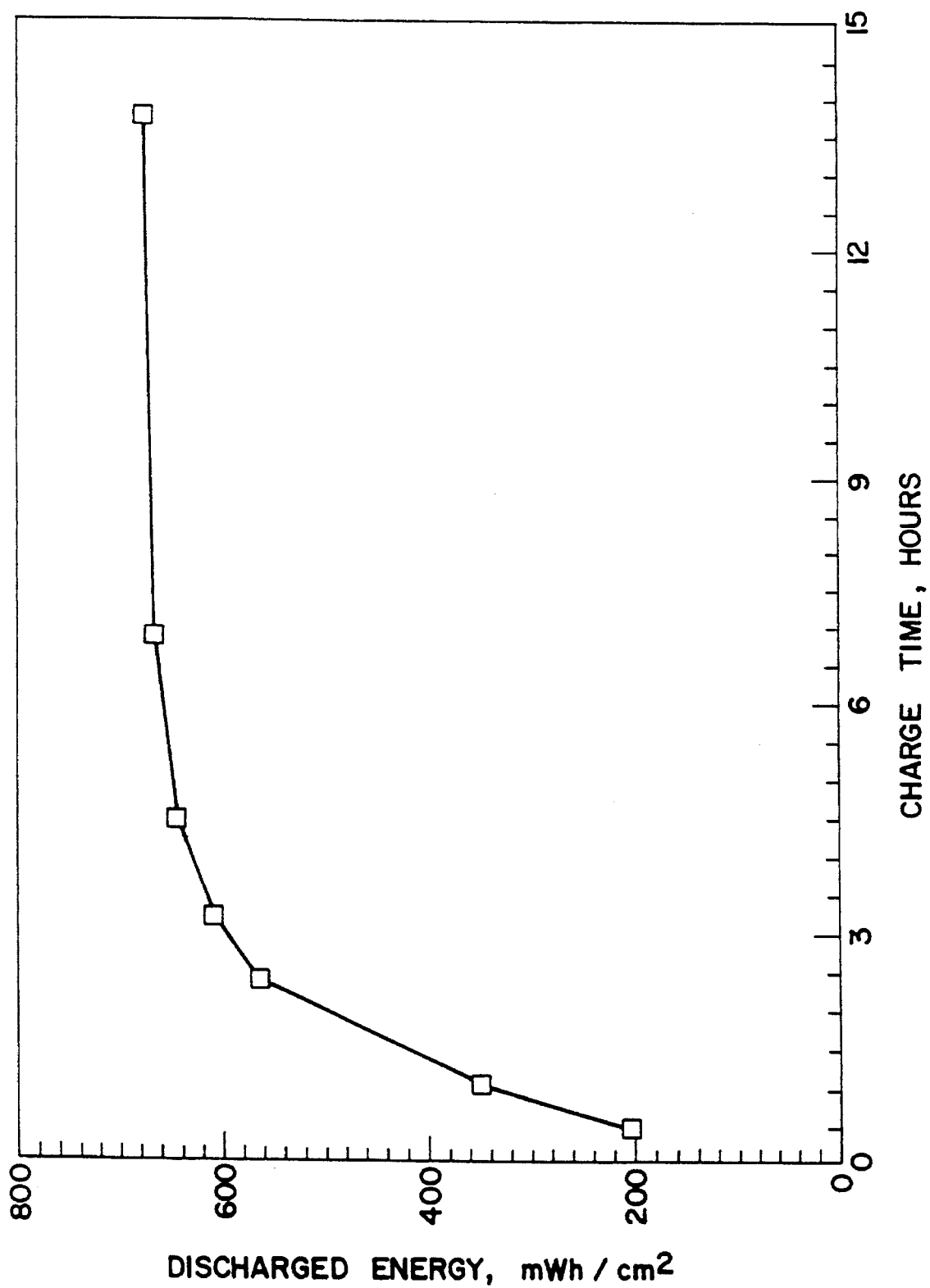
FIG. 5 is a graphical illustration of the relationship between the cell discharge energy and charged time.

FIG. 5 shows the relationship between the charging time in hours and the discharged energy in $mWh/cm^2$ (milliwatt hours per centimeter square), the curve representing an electrode made according to Example 9. As can be seen from FIG. 5, a cell made according to the present invention can be charged up to 20 $mWh/cm^2$ in about one half hour and by about 3 hours 600 $mWh/cm^2$ can be charged, representing almost 90% of the final charge attainable even after 12 hours of charging time. This is a significant advantage over the prior art presently known wherein charging times for the prior art automobile batteries are in the neighborhood of 8–15 hours. Recharging a battery for an electric car in half an hour as opposed to 8 hours is an extraordinary improvement.

Figure 6:
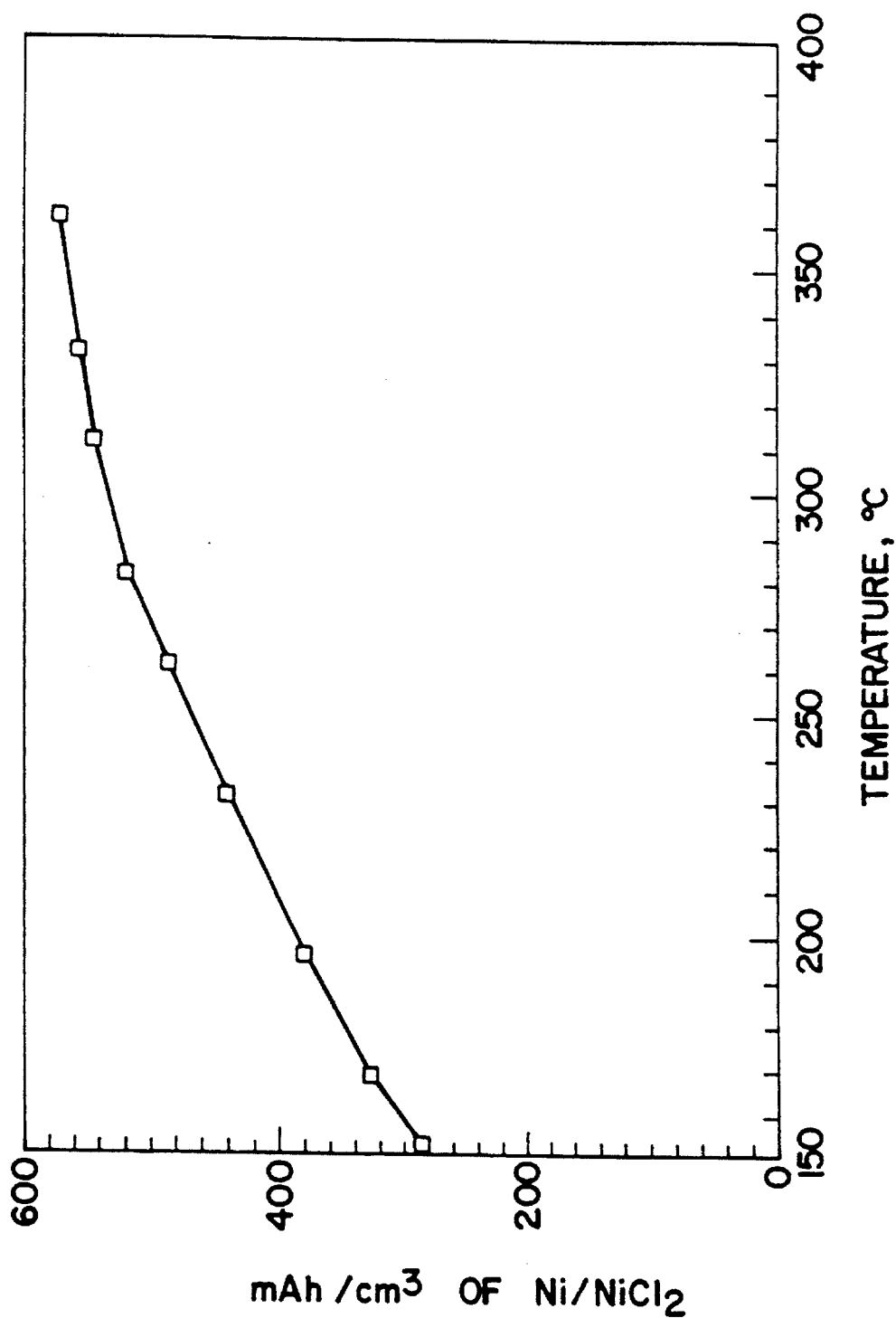
FIG. 6 is a graphical illustration of the relationship between cell volumetric capacity and cell operating temperature.

FIG. 6 shows the relationship between the volumetric capacity in milliamp hours per centimeter cubed ($mAh/cm^3$) and the operating temperature of the battery. It can be seen from FIG. 6, which represents the battery with a positive electrode made according to Example 9, that such a battery can operate at 150° C. compared to the usual 250° C.–335° C. operating temperatures for batteries presently being used. The advantage of low operating temperatures and the batteries in the environment are significant. By operating the battery at lower temperatures reduces the heat management problems inherent with any battery of this type. Operating at temperatures of 335° C. increases the solubility of the nickel chloride present in the battery and when nickel ions exchange for sodium ions in the electrolyte, the internal impedance of the battery rises and hence, the heat given off during discharge rises. Moreover, lowering the operating temperature of the battery increases the battery life by reducing the glass seal corrosion. The glass seals usually used in these batteries between the metal and ceramics of the cell tend to corrode and the lower the battery operating temperature, the slower the corrosion reaction, thereby extending the life of the battery.

There is a difference in morphology for electrodes made in accordance with Example 9 characterized as ANL 92 and an electrode without the pore formers or halide additives which is designated ANL 90. The high surface area of about 10.3 $m^2/cm^3$ of the Example 9 electrode (ANL 92) includes the existence of micro pores in the range of between about 0.005 and 0.5 micrometers as well as macro pores in the range of from about 1 to about 80 micrometers. The simultaneous presence of both micro pores and macro pores, referred to as bimodal pore distribution, results in an improved morphology of the nickel chloride electrode resulting in a high BET area. The macro pores in the nickel matrix do not get blocked by the formation of sodium chloride crystals during the discharge reaction which gives easy access of the active material to the electrode which would have been blocked if the macro pores were not there. The existence of the micro pores increases the high surface area of the electrode which apparently results when combined with the macro pores in increased specific capacity and volumetric capacity as illustrated in TABLE I.

TABLE I

NICKEL CHLORIDE ELECTRODE CAPACITY CHARACTERISTICS FOR VARIOUS NICKEL SUBSTRATES

| Nickel Electrode | BET Area $cm^2/g$ | Area Capacity $mAh/cm^2$ | Specific Capacity $mAh/g$ | Volumetric Capacity $mAh/cm^3$ |
|---|---|---|---|---|
| Nonporous wire | ~3.8 | ~$1.7 \times 10^{-1}$ | ~$6.3 \times 10^{-1}$ | — |
| Felt | $3 \times 10^3$ | $1.8 \times 10^{-1}$ | 56 | 30 |
| ANL-90 (Sintered) | $1.8 \times 10^4$ | $7.0 \times 10^{-3}$ | 142 | 200 |
| ANL-92 (Sintered with Poreformer) | $7.7 \times 10^4$ | $6.0 \times 10^{-3}$ | 399 | 551 |

TABLE I shows that the ANL 92 (Example 9) electrode is approximately 250% better in both specific capacity and volumetric capacity than is the prior ANL 90 electrode without the pore former and halide additives. Because the volumetric capacity determines the available miles a car can operate before charging and is related to the power output of the battery, it is volumetric capacity which is the most telling statistic when judging performance of electric automobile batteries.

Another feature of the invention is that batteries presently available for electric car use have an initial power in the neighborhood of 100 watts per kilogram (W/kg) but by the end of the discharge cycle, the presently available batteries are usually operating at about 60 W/kg. The battery of Example 9 has an initial power of about 200 W/kg and a final power, that is at the end of discharge, of about 170 W/kg demonstrating not only the 100% increase in battery initial power but just as important almost a 300% increase in power at the end of the discharge cycle. This feature provides a significant advantage for electric car operation because the battery power at the end of the discharge cycle is within about 15% of initial power, a substantial improvement over batteries which are presently available.

Accordingly, it is seen with the battery of the present invention, specific capacity, volumetric capacity and specific power are all greatly increased with respect to the best known prior art batteries of this type.

By reversing the physical position of the positive electrode or cathode and the negative electrode or anode illustrated in FIG. 1, more power can be generated. In such an example, the nickel chloride would be outside the β" alumina tube and the outer container would be preferably nickel, whereas the inner rod would be any good electrical conductor such as iron or steel or any other metal which would not chemically react with the liquid sodium positioned inside the tube.

It is also known that the thickness of the electrode has an effect on cell operation and varying the thickness of the electrode, will vary the impedance within the cell; however, it is believed that the addition of the additives described herein, these being bromide, iodide and sulfur containing materials and use of a suitable pore former enhances the discharge capacity of the cell and lowers the impedance.

Although the cell voltage of the Na/FeCl$_2$ cell (2.32 V) is somewhat lower than its counterpart Na/NiCl$_2$ (2.58 V), the Na/FeCl$_2$ cell system does offer some unique advantages. One of the major advantages of the Na/FeCl$_2$ battery system is that the iron chloride positive electrode can utilize scrap iron, table salt, and recycled aluminum cans as the materials of fabrication that will reduce the cost of the commercial full size battery by a significant amount. The use of these materials may also help the environment in a variety of ways. The performance of the present batteries, however, is severely limited due to the problem of overcharging of the cells, which results in the oxidation of iron (II) to iron (III) chloride in the positive electrode. The Fe (III) thus formed is exchanged with the sodium ions of the β"-alumina electrolyte. The exchange of the Na$^+$ by Fe$^{3+}$ causes the impedance of the β"-alumina and thus the cell to rise by a significant amount. Ion exchange also severely damages the integrity of the β"-alumina. Due to these effects the power, and thus the life of the Na/FeCl$_2$ cell declines rapidly with cycling to unacceptable values.

It was unexpectedly discovered that overcharge protection of the iron chloride was obtained by modifying the chemistry of the iron chloride electrode by the use of the chemical additives such as NaI and S, which prevent the oxidation of FeCl$_2$ to FeCl$_3$ and hence improve the cell performance. In addition to the overcharge protection, these additives significantly enhanced the capacity and power performance of the iron chloride electrode due to the modification of the electrode chemistry during the charge and discharge of the cell. The electrode fabricated with these additives has shown excellent overcharge protection, energy, power, and cycle life. This new chemistry would save nickel for the cell component fabrication. In our experiments we observed that even at the high charge voltage of 2.9 V vs. Na, there were no indications of FeCl$_3$ formation. At this charge voltage a cell without the additives would disintegrate. The suppression of FeCl$_3$ formation during the charge reaction is due to the preferred electrochemical oxidation of NaI to I$_2$ at the potentials where Fe(II) otherwise would oxidize to Fe(III) hence suppressing the formation of Fe(III). Iodine thus formed reacts with iron metal to form Fe(II). In addition, a redox reaction (2 NaI+2 FeCl$_3$→2 FeCl$_2$+I$_2$+2 NaCl) probably also takes place very rapidly to convert any FeCl$_3$, if formed, to give FeCl$_2$. The details of the incorporation of these chemical additives in the FeCl$_2$ electrode are provided in the following examples.

EXAMPLE 12

2 wt % S+10 wt % Pore Former+10 wt % NaI

This example illustrates the typical fabrication of Fe/FeCl$_2$ electrode with additives to provide overcharge protection. The weight of the materials are relative to the dry electrode weight 3.87 g iron powder (7.86 g/cm$^3$ bulk density), 1.73 g NaCl powder with mesh size −270+325, and 0.905 g sodium chloride with mesh size −325+400 were mixed together thoroughly. To this mixture of the salts, 0.65 g of the pore former (ammonium bicarbonate) was added and thoroughly mixed. The mixture was then placed in a stainless steel die and pressed to obtain an electrode with a 2.85 cm diameter and an 0.5 cm thickness. This electrode was then placed in a tube furnace and heated first at 250° C. for 30 minutes under a hydrogen containing atmosphere (5% hydrogen+95% helium) in order to remove pore former as ammonia, water, and carbon dioxide gases and finally to 700° C. for one hour for sintering. Before placing the electrode in the cell assembly, 2 wt % sulfur (0.13 g) and 10 wt % sodium iodide (0.65 g) were added to the NaAlkCl$_4$ electrolyte. The electrode along with this electrolyte mixture was then placed in the positive electrode compartment of the cell.

EXAMPLE 13

5 wt % S+10 wt % Pore Former+10 wt % NaBr+10 wt % NaI

The combination of 10 wt % pore former, 10 wt % NaBr, and 5 wt % NaI was introduced in the electrode during electrode fabrication as described in Example 12. The remaining 5 wt % NaI and 5 wt % S were mixed thoroughly with the liquid electrolyte by slowly and carefully increasing the temperature to 200° C. After mixing the sulfur and NaI with the NaAlCl$_4$ electrolyte, the positive electrode was placed in the positive electrode assembly of a Na/FeCl$_2$ cell.

Both the electrodes of Examples 12 and 13 were repeatedly cycled without the expected disintegration due to Fe(III) formation, and upon examination no Fe(III) was detected, such that the final discharge power of the cell is at least 80% of the initial power of the cell.

While there has been disclosed what is considered to be the preferred embodiment of the present invention, it is understood that various changes in the details may be made without departing from the spirit, or sacrificing any of the advantages of the present invention.

The embodiments of this invention in which an exclusive property or privilege is claimed are defined as follows:

1. An electrochemical cell comprising a bimodal positive electrode, a negative electrode of an alkali metal, and a compatible electrolyte including an alkali metal salt molten at the cell operating temperature, said positive electrode comprising an electrochemically active layer of at least one transition metal chloride at least partially present as a charging product, and a bromide and/or iodide and sulfur containing additives in said positive electrode or electrolyte, said bromide and/or iodide additive being present in an amount in the range of from about 10% to about 30% by weight based on the weight of said positive electrode and the sulfur additive being present in an amount not greater than about 10% by weight of said positive electrode, the amount of additives being sufficient to provide electrode capacity on excess of 400 Ah/cm$^3$ by being incorporated into the transition metal chloride layer formed during charging of the cell, wherein a pore former of an ammonium salt is present in the positive electrode prior to formation thereof in the range of about 10–30 wt %, such that the final discharge power of the cell is at least 80% of the initial power of the cell.

2. The electrochemical cell of claim 1, wherein the transition metal chloride layer contains said additives, and wherein the electrolyte contains said additives for incorporation into said chloride layer during charging of the cell.

3. The electrochemical cell of claim 1, wherein the amount of the bromide and/or iodide containing additive is in the range of about 1–25 wt % and about 0.05–25 wt %, respectively, based on the weight of the positive electrode and equated to NaBr and NaI, and wherein the sulfur containing additive is present in the range of about 2–10 wt % based on the weight of the positive electrode with the total of the bromide and sulfur additives being in the range of about 1–25 wt %, the total of the iodide and sulfur additives being in the range of about 0.10–25 wt % and the total of the bromide, iodide and sulfur additives being in the range of about 1–30 wt %.

4. The electrochemical cell of claim 3, wherein the alkali metal is sodium, the alkali metal salt is sodium chloride, the bromide and iodide containing additives are bromide and iodide additives, and the transition metal is nickel or iron.

5. The electrochemical cell of claim 1, wherein the positive electrode has a capacity in excess of 500 mAh/cm$^3$.

6. The electrochemical cell of claim 1, wherein the cell is operable at about 150° C.

7. The electrochemical cell of claim 1, wherein the alkali metal is sodium, the alkali metal salt is sodium chloride, the transition metal is one or more of nickel, iron or alloys thereof, and the bromide and iodide containing additives are sodium bromide and sodium iodide additives.

8. The electrochemical cell of claim 1, wherein the sulfur containing additive is present in an amount of about 0.05–10 wt % and a pore former is present in the positive electrode prior to formation thereof in the range of about 5–20 wt %.

9. The electrochemical cell of claim 1, wherein about 30% of the discharged energy can be recharged in about ½ hour.

10. The electrochemical cell of claim 1, wherein about 90% of the discharged energy can be recharged in about 3 hours.

11. The electrochemical cell of claim 1, wherein the positive electrode after formation thereof has micro pores in the range of from about 0.05 to about 0.5 micrometers and macro pores in the range of from about 1 micrometer to about 80 micrometers.

12. A bimodal positive electrode for an electrochemical cell, comprising a sintered electrochemically active layer of at least one transition metal chloride at least partially present as a charging product and additives of bromide and/or iodide and sulfur, wherein said additives are present in the range of from about 10% to about 30% by weight of said positive electrode and wherein said sintered electrode BET area is greater than about 6×10$^4$ cm$^2$/g of Ni, and wherein both micropores in the range of from about 0.005 to about 0.5 micrometers and micropores in the range of from about 1 to about 70 micrometers are present, such that the final discharge power of the cell is at least 80% of the initial power of the cell.

13. The positive electrode of claim 12, wherein the transition metal is Ni, Fe or alloys thereof and both bromide and iodide additives are present with the sulfur additive.

14. A method of reducing the operating temperature and improving the capacity of an electrochemical cell over repeated charge and discharge cycles, the cell comprising a bimodal positive electrode comprising an electrochemically active layer of one or more transition metal chlorides reducible during discharge to the transition metal, a negative electrode of an alkali metal, and a compatible electrolyte containing an alkali metal chloride tat least partially as a product of the cell discharge, the method comprising the steps of fabricating the cell in a discharge state of the transitional metal positive electrode, the alkali metal negative electrode and the electrolyte, and adding a bromide and/or iodide containing additive along with a sulfur containing additive to the electrolyte sufficient to improve the cell capacity when incorporated into the transition metal chloride layer during charging of the cell, the electrochemical cell being capable of operation at temperatures below 180° C., wherein the final discharge power of the cell is at least 80% of the initial power of the cell.

15. The method of claim 14 including the step of charging the cell to incorporate the additives into the chloride layer, and wherein the electrode has a volumetric capacity in excess of 500 mAh/cm$^3$ and is operable at temperatures below 160° C.

* * * * *

UNITED STATES PATENT AND TRADEMARK OFFICE
CERTIFICATE OF CORRECTION

PATENT NO. : 5,536,593
DATED : July 16, 1996
INVENTOR(S) : Laszlo I Redey, et al.

It is certified that error appears in the above-identified patent and that said Letters Patent is hereby corrected as shown below:

Column 14,

Claim 14, line 31, "tat" should be --at--.

Claim 14, line 34, "transitional" should be --transition--.

Signed and Sealed this

Twelfth Day of November, 1996

Attest:

BRUCE LEHMAN

Attesting Officer  Commissioner of Patents and Trademarks